(12) United States Patent
Sankaran et al.

(10) Patent No.: US 12,372,133 B2
(45) Date of Patent: Jul. 29, 2025

(54) SHOCK ABSORBER

(71) Applicant: Hitachi Astemo, Ltd., Ibaraki (JP)

(72) Inventors: Shivanand Sankaran, Canton, MI (US); Sean Lundberg, Dearborn Heights, MI (US); Jordan Truitt, Farmington Hills, MI (US)

(73) Assignee: Hitachi Astemo, Ltd., Ibaraki (JP)

( * ) Notice: Subject to any disclaimer, the term of this patent is extended or adjusted under 35 U.S.C. 154(b) by 398 days.

(21) Appl. No.: 17/954,389

(22) Filed: Sep. 28, 2022

(65) Prior Publication Data

US 2024/0102530 A1    Mar. 28, 2024

(51) Int. Cl.
*F16F 9/348* (2006.01)
*B60G 13/08* (2006.01)
*B60G 15/06* (2006.01)
*F16F 9/22* (2006.01)
*F16F 9/49* (2006.01)

(52) U.S. Cl.
CPC .............. *F16F 9/348* (2013.01); *B60G 13/08* (2013.01); *B60G 15/062* (2013.01); *F16F 9/22* (2013.01); *F16F 9/49* (2013.01); *B60G 2202/23* (2013.01); *B60G 2202/24* (2013.01); *B60G 2202/31* (2013.01)

(58) Field of Classification Search
CPC ..... F16F 9/348; F16F 9/22; F16F 9/49; B60G 2202/23; B60G 2202/24; B60G 2202/31; B60G 13/08

USPC .......... 188/284, 286, 287, 288, 315, 322.13, 188/322.14, 322.22
See application file for complete search history.

(56) References Cited

U.S. PATENT DOCUMENTS

| | | | |
|---|---|---|---|
| 9,605,726 B2 * | 3/2017 | Baldoni | F16F 9/49 |
| 11,187,298 B2 * | 11/2021 | Mallin | F16F 9/49 |
| 11,796,024 B2 * | 10/2023 | Baek | F16F 9/49 |
| 2018/0355944 A1 | 12/2018 | Veltum et al. | |
| 2021/0123495 A1 | 4/2021 | Sankaran et al. | |

OTHER PUBLICATIONS

International Search Report received in corresponding International Application No. PCT/US2023/032854 dated Feb. 7, 2024.
Written Opinion received in corresponding International Application No. PCT/US2023/032854 dated Feb. 7, 2024.

* cited by examiner

*Primary Examiner* — Christopher P Schwartz
(74) *Attorney, Agent, or Firm* — Mattingly & Malur, PC (57) ABSTRACT

This shock absorber includes a first valve assembly connected to one end of a tube in an axial direction, a piston assembly dividing an inner chamber of the tube into a first chamber and a second chamber, a piston rod extending from the tube through the first chamber with the piston assembly connected to an intermediate position in the axial direction, a cup provided in the second chamber, and a second valve assembly disposed in the second chamber to be connected to the piston rod and configured to enter and exit from the cup. The cup includes a sleeve disposed in the second chamber with a gap between itself and the tube in a radial direction, and a base adapter fixed to the sleeve by press fitting and provided between the sleeve and the first valve assembly.

3 Claims, 4 Drawing Sheets

SHOCK ABSORBER

BACKGROUND OF THE INVENTION

Field of the Invention

The present invention relates to a shock absorber.

Description of Related Art

There are shock absorbers in which a damping force increases when a rod reaches a predetermined range on a limit side during a compression stroke in which the rod is pushed into a cylinder (see, for example, the specification of U.S. Pat. No. 9,605,726).

Incidentally, there has been a demand to suppress an increase in cost in shock absorbers.

Accordingly, an objective of the present invention is to provide a shock absorber in which an increase in cost can be suppressed.

SUMMARY OF THE INVENTION

In order to achieve the above-described objective, one aspect of a shock absorber of the present invention includes a tube having an inner chamber inside, a first valve assembly connected to one end of the tube in an axial direction, a piston assembly dividing the inner chamber into a first chamber and a second chamber, a piston rod extending from the tube through the first chamber with the piston assembly connected to an intermediate position thereof in the axial direction, a cup provided in the second chamber, and a second valve assembly disposed in the second chamber to be connected to the piston rod and configured to enter and exit from the cup. The cup includes a sleeve disposed in the second chamber with a gap between itself and the tube in a radial direction, and a base adapter fixed to the sleeve by press fitting and provided between the sleeve and the first valve assembly.

According to the above-described aspect of the present invention, it is possible to suppress an increase in cost.

DETAILED DESCRIPTION OF THE INVENTION

First Embodiment

A shock absorber of a first embodiment according to the present invention will be described with reference to FIGS. 1 to 3. Further, in the following description, for convenience of explanation, an upper side in the drawings will be referred to as "upper" and a lower side in the drawings will be referred to as "lower."

Figure 1:
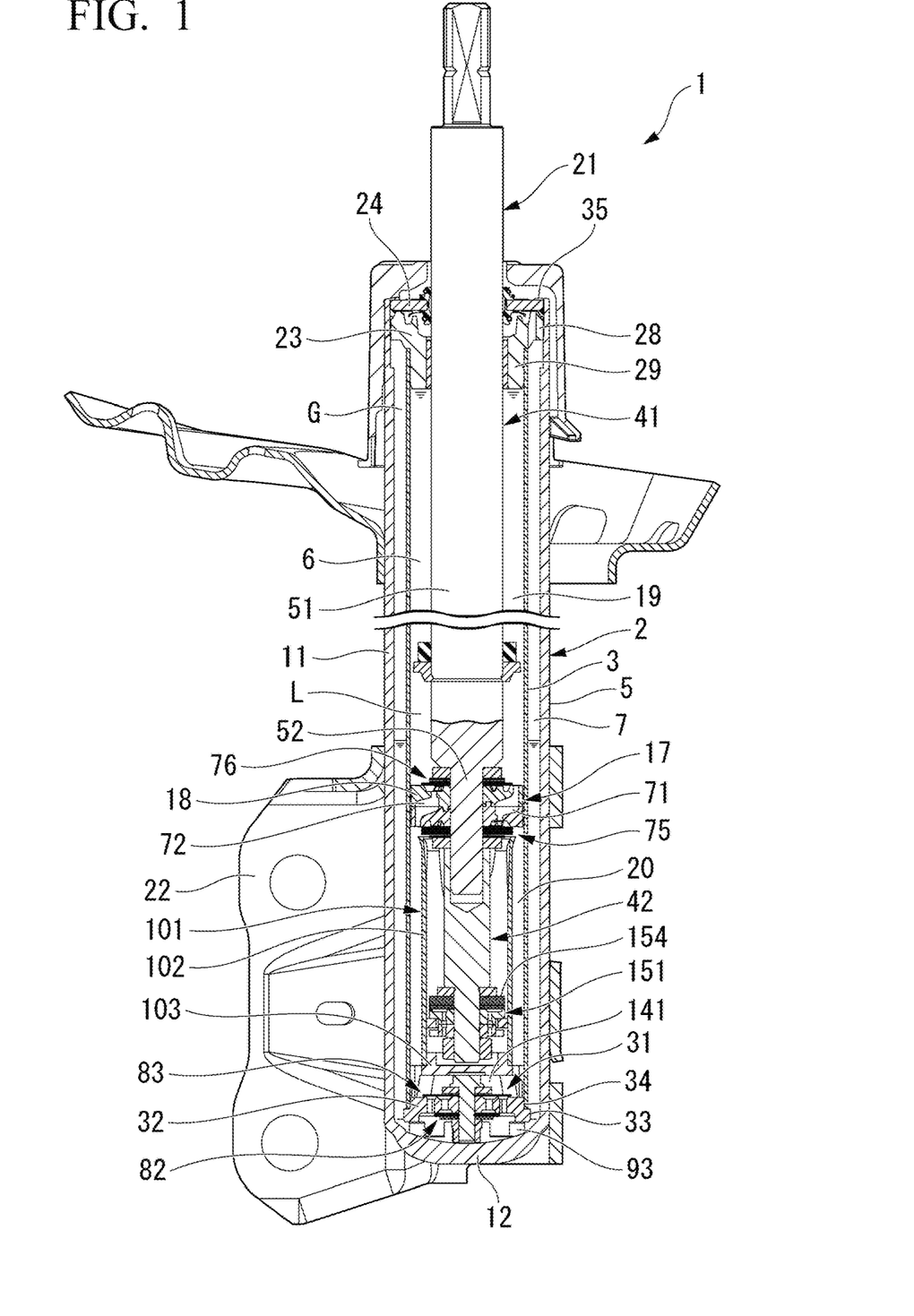
FIG. 1 is a cross-sectional view showing a shock absorber of a first embodiment according to the present invention.

As shown in FIG. 1, a shock absorber 1 of the first embodiment is a dual-tube type hydraulic shock absorber. The shock absorber 1 is used in suspension devices of vehicles, specifically, automobiles. The shock absorber 1 includes a cylinder 2. The cylinder 2 includes a tube 3 and a shell 5. The tube 3 has a cylindrical shape. The shell 5 has a bottomed cylindrical shape. The shell 5 has an inner diameter larger than an outer diameter of the tube 3. The tube 3 is disposed on a radial inner side of the shell 5. A central axis of the tube 3 and a central axis of the shell 5 coincide with each other. The tube 3 has an inner chamber 6 inside. A reservoir chamber 7 is provided between the tube 3 and the shell 5.

The shell 5 includes a barrel part 11 and a bottom part 12. The barrel part 11 and the bottom part 12 are formed seamlessly and integrally. The barrel part 11 has a cylindrical shape. The bottom part 12 closes a lower portion of the barrel part 11.

The shock absorber 1 includes a piston assembly 17. The piston assembly 17 is disposed in the tube 3 of the cylinder 2. The piston assembly 17 includes a piston 18. In the piston assembly 17, the piston 18 is fitted in the tube 3 to be slidable. The piston 18 divides the inner chamber 6 in the tube 3 into two chambers, a first chamber 19 on one side and a second chamber 20 on the other side. The first chamber 19 is on a side opposite to the bottom part 12 with respect to the piston 18 in an axial direction of the tube 3. The second chamber 20 is on the bottom part 12 side with respect to the piston 18 in the axial direction of the tube 3. In the cylinder 2, an oil fluid L as a working fluid is sealed in the inner chamber 6 inside the tube 3. In the cylinder 2, the oil fluid L and a gas G are sealed as working fluids in the reservoir chamber 7 between the tube 3 and the shell 5.

The shock absorber 1 includes a piston rod 21. One side of the piston rod 21 in the axial direction is disposed in the tube 3 of the cylinder 2. This one side of the piston rod 21 is connected to the piston assembly 17. The other side of the piston rod 21 in the axial direction extends from the cylinder 2 to the outside of the cylinder 2. The piston rod 21 extends from the tube 3 and the shell 5, that is, the cylinder 2, through the first chamber 19 with the piston assembly 17 attached thereto.

In the shock absorber 1, a portion of the piston rod 21 extending from the cylinder 2 is disposed at an upper portion to be connected to a vehicle body of a vehicle. At the same time, in the shock absorber 1, a mounting bracket 22 fixed to the barrel part 11 of the shell 5 is disposed at a lower portion to be connected to a wheel side of the vehicle.

The piston 18 is fixed to the piston rod 21. Therefore, the piston 18 and the piston rod 21 move together. In the shock absorber 1, a stroke in which the piston rod 21 moves in a direction to increase a protrusion amount from the cylinder 2 is an extension stroke in which the entire length increases. In the shock absorber 1, a stroke in which the piston rod 21 moves in a direction to decrease the protrusion amount from the cylinder 2 is a compression stroke in which the entire length decreases. In the shock absorber 1, the piston 18 moves to the first chamber 19 side during the extension stroke. In the shock absorber 1, the piston 18 moves to the second chamber 20 side during the compression stroke.

A rod guide 23 is fitted to an upper end opening side of the tube 3 and an upper end opening side of the shell 5. A seal member 24 is fitted to the shell 5 on an upper side of the rod guide 23. Both the rod guide 23 and the seal member 24 are annular. The piston rod 21 is inserted through a radial inner side of the rod guide 23 and the seal member 24. The piston rod 21 slides with respect to the rod guide 23 and the seal member 24 in the axial direction. The piston rod 21 extends from the inside of the cylinder 2 to the outside of the cylinder 2 from the seal member 24.

The rod guide 23 restricts movement of the piston rod 21 in the radial direction with respect to the tube 3 and the shell 5 of the cylinder 2. The piston rod 21 is fitted in the rod guide 23 and the piston 18 is fitted in the tube 3. Thereby, a central axis of the piston rod 21 and a central axis of the tube 3 coincide with each other. The rod guide 23 supports the piston rod 21 to be movable in the axial direction of the piston rod 21. The seal member 24 has an outer circumferential portion in close contact with the shell 5. The seal member 24 has an inner circumferential portion in close contact with an outer circumferential portion of the piston rod 21. The piston rod 21 moves in the axial direction of the seal member 24 with respect to the seal member 24. The seal member 24 suppresses the oil fluid L in the tube 3 and the high-pressure gas G and the oil fluid L in the reservoir chamber 7 leaking out to the outside.

The rod guide 23 includes a large diameter part 28 and a small diameter part 29. The large diameter part 28 has an outer diameter larger than an outer diameter of the small diameter part 29. In the rod guide 23, the small diameter part 29 is provided on a lower side of the large diameter part 28. The rod guide 23 is fitted to an inner circumferential portion of an upper end of the tube 3 at the small diameter part 29 on the lower side. At that time, an upper end portion of the tube 3 is in contact with the large diameter part 28 in the axial direction of the tube 3. The rod guide 23 is fitted to an upper inner circumferential portion of the shell 5 at the large diameter part 28 on the upper side.

A first valve assembly 31 is placed on the bottom part 12 of the shell 5. The first valve assembly 31 includes a seat member 32. The seat member 32 is placed in contact with an upper surface of the bottom part 12 of the shell 5. The seat member 32 is positioned in the radial direction with respect to the shell 5. The seat member 32 includes a large diameter part 33 and a small diameter part 34. The large diameter part 33 has an outer diameter larger than an outer diameter of the small diameter part 34. In the seat member 32, the large diameter part 33 is provided on a lower side of the small diameter part 34. The seat member 32 is fitted to an inner circumferential portion of a lower end of the tube 3 at the small diameter part 34 on an upper side. At that time, the lower end portion of the tube 3 comes in contact with the large diameter part 33 in the axial direction of the tube 3. Thereby, the first valve assembly 31 is connected to one end of the tube 3 in the axial direction.

A swaged part 35 is provided at an upper end portion of the shell 5. The swaged part 35 is formed by swaging the upper end portion of the shell 5 inward in the radial direction of the shell 5. The seal member 24 is fixed to the cylinder 2 by being sandwiched between the swaged part 35 and the rod guide 23. When the swaged part 35 is formed, the seal member 24 is pressed against the rod guide 23 in the axial direction of the shell 5 while the bottom part 12 of the shell 5 is placed on a table. Then, the seal member 24, the rod guide 23, the tube 3, and the seat member 32 are in contact with each other without a gap in the axial direction. Thereby, an axial force is generated in the seal member 24, the rod guide 23, the tube 3, and the seat member 32. In this state, the swaged part 35 is formed. Therefore, after the swaged part 35 is formed, an axial force is generated in the seal member 24, the rod guide 23, the tube 3, and the seat member 32.

The piston rod 21 includes a rod main body 41 and an extender 42.

The rod main body 41 includes a main shaft part 51 and a mounting shaft part 52. Both the main shaft part 51 and the mounting shaft part 52 have a rod shape. The mounting shaft part 52 has an outer diameter smaller than has an outer diameter of the main shaft part 51. The mounting shaft part 52 extends from one end of the main shaft part 51 in the axial direction. A central axis of the mounting shaft part 52 coincides with a central axis of the main shaft part 51. The mounting shaft part 52 is disposed in the tube 3 in its entirety. The main shaft part 51 of the rod main body 41 of the piston rod 21 slides with respect to the rod guide 23 and the seal member 24 in the axial direction of them.

Figure 2:
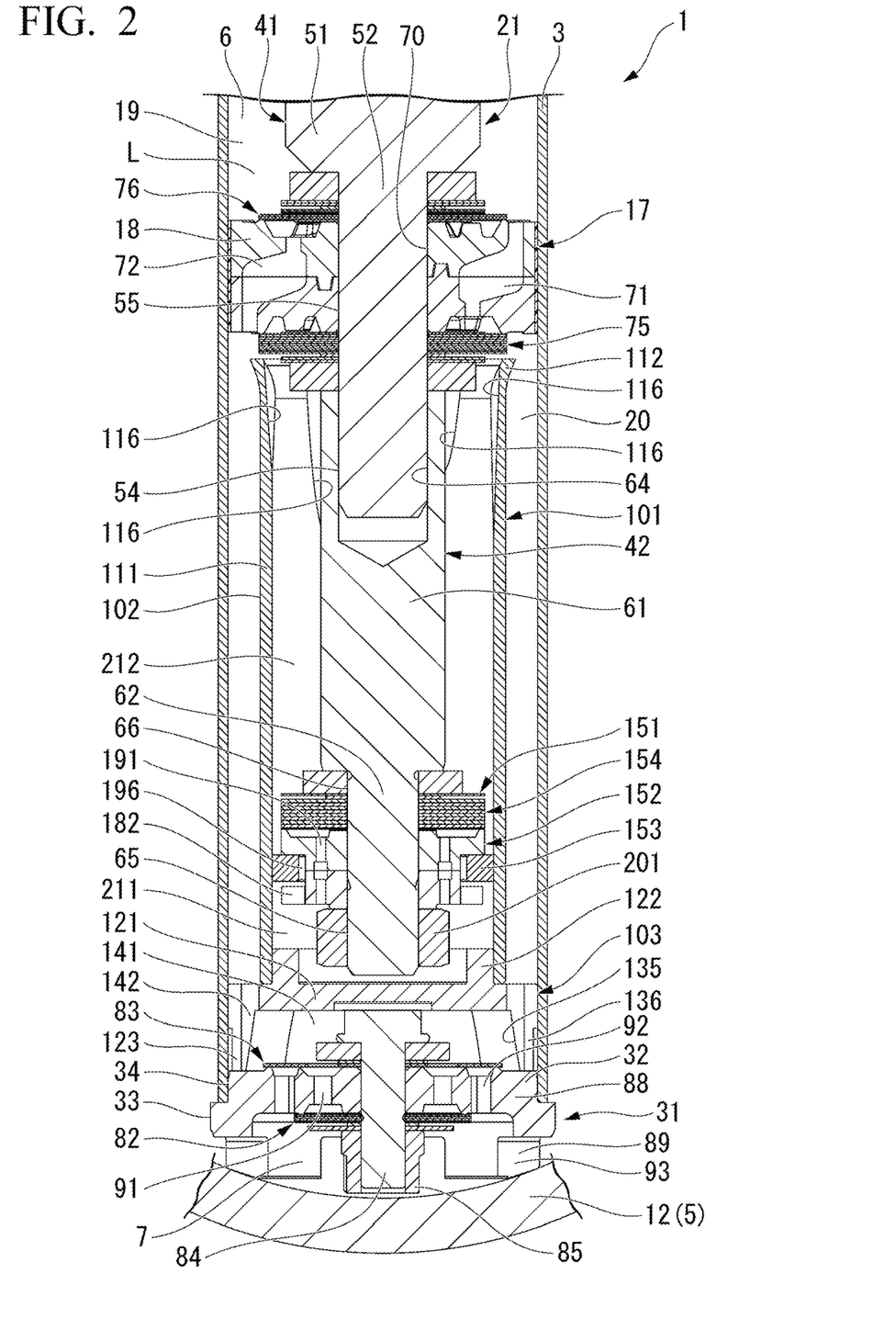
FIG. 2 is a cross-sectional view of a main part showing the shock absorber of the first embodiment according to the present invention.

As shown in FIG. 2, an end portion of the mounting shaft part 52 on a side opposite to the main shaft part 51 in the axial direction of the mounting shaft part 52 is a screw shaft part 54. The screw shaft part 54 has a male screw formed on an outer circumferential portion. A portion of the mounting shaft part 52 between the main shaft part 51 and the screw shaft part 54 in the axial direction of the mounting shaft part 52 is a fitting shaft part 55. An outer circumferential surface of the fitting shaft part 55 is a cylindrical surface.

The extender 42 includes a main shaft part 61 and a mounting shaft part 62. Both the main shaft part 61 and the mounting shaft part 62 have a rod shape. The mounting shaft part 62 has an outer diameter smaller than an outer diameter of the main shaft part 61. The mounting shaft part 62 extends from one end of the main shaft part 61 in the axial direction. A central axis of the mounting shaft part 62 coincides with a central axis of the main shaft part 61.

A screw hole 64 is formed in the main shaft part 61 at an end portion of the main shaft part 61 on a side opposite to the mounting shaft part 62 in the axial direction. The screw hole 64 is formed at a center position of the main shaft part 61 in the radial direction. The screw hole 64 extends in the axial direction of the main shaft part 61. The screw hole 64 opens upward.

An end portion of the mounting shaft part 62 on a side opposite to the main shaft part 61 in the axial direction of the mounting shaft part 62 is a screw shaft part 65. The screw shaft part 65 has a male screw formed on an outer circumferential portion. A portion of the mounting shaft part 62 between the main shaft part 61 and the screw shaft part 65 in the axial direction of the mounting shaft part 62 is a fitting shaft part 66. An outer circumferential surface of the fitting shaft part 66 is a cylindrical surface.

In the rod main body 41, the screw shaft part 54 thereof is screwed into the screw hole 64 of the extender 42. Thereby, the rod main body 41 and the extender 42 are connected with their central axes coincided with each other. Thereby, the piston rod 21 is formed. The extender 42 is disposed in the tube 3 in its entirety.

The piston 18 is attached to the piston rod 21 at the mounting shaft part 52 of the rod main body 41. Then, the piston 18 is disposed between the main shaft part 51 of the rod main body 41 and the extender 42. The piston 18 is fitted in the fitting shaft part 55 of the mounting shaft part 52.

A through hole 70 is formed at a center of the piston 18 in the radial direction. The through hole 70 penetrates the piston 18 in the axial direction of the piston 18. The fitting shaft part 55 of the rod main body 41 is fitted into the through hole 70 of the piston 18. A first passage 71 and a second passage 72 are formed in the piston 18 on a side outward from the through hole 70 in the radial direction of the piston 18. The first passage 71 and the second passage 72 penetrate the piston 18 in the axial direction of the piston 18.

A plurality of first passages 71 and a plurality of second passages 72 are formed in the piston 18. The first passages 71 and the second passages 72 are alternately disposed in the circumferential direction of the piston 18. Both the first passages 71 and the second passages 72 allow communication between the first chamber 19 and the second chamber 20.

The piston assembly 17 includes a first damping valve 75 and a second damping valve 76.

The first damping valve 75 is a disc valve constituted by laminating a plurality of annular discs. The fitting shaft part 55 of the rod main body 41 is fitted to a radial inner side of the first damping valve 75. The first damping valve 75 is disposed between the piston 18 and the extender 42. The first damping valve 75 opens the first passage 71 when a portion on the outer circumferential side is separated from the piston 18. Thereby, the first damping valve 75 allows the oil fluid L to flow from the first chamber 19 to the second chamber 20 through the first passage 71. At that time, the first damping valve 75 suppresses a flow of the oil fluid L to generate a damping force. The first damping valve 75 is provided in the first passage 71 to generate a damping force by suppressing the flow of the oil fluid L that occurs in the first passage 71 during the extension stroke. The first damping valve 75 closes the first passage 71 when the portion on the outer circumferential side comes in contact with the piston 18. A fixed orifice (not shown) is provided at a portion between the first damping valve 75 and the piston 18. The fixed orifice allows the oil fluid L to flow from the first chamber 19 to the second chamber 20 through the first passage 71 even if the portion on the outer circumferential side of the first damping valve 75 comes in contact with the piston 18.

The second damping valve 76 is a disc valve constituted by laminating a plurality of annular discs. The fitting shaft part 55 is fitted to a radial inner side of the second damping valve 76. The second damping valve 76 is disposed between the main shaft part 51 of the rod main body 41 and the piston 18. The second damping valve 76 opens the second passage 72 when a portion on the outer circumferential side is separated from the piston 18. Thereby, the second damping valve 76 allows the oil fluid L to flow from the second chamber 20 to the first chamber 19 via the second passage 72. At that time, the second damping valve 76 generates a damping force by suppressing a flow of the oil fluid L. The second damping valve 76 is provided in the second passage 72 to generate a damping force by suppressing the flow of the oil fluid L that occurs in the second passage 72 during the compression stroke. The second damping valve 76 closes the second passage 72 when the portion on the outer circumferential side comes in contact with the piston 18. A fixed orifice (not shown) is provided at a portion between the second damping valve 76 and the piston 18. The fixed orifice allows the oil fluid L to flow from the second chamber 20 to the first chamber 19 through the second passage 72 even if the portion on the outer circumferential side of the second damping valve 76 comes in contact with the piston 18.

The piston assembly 17 including the piston 18, the first damping valve 75, and the second damping valve 76 is attached to the mounting shaft part 52 of the rod main body 41 by the extender 42. Therefore, the piston assembly 17 is disposed between the main shaft part 51 of the rod main body 41 and the extender 42. The piston assembly 17 is connected to the piston rod 21 at an intermediate position in the axial direction.

The first valve assembly 31 includes a disc valve 82, a disc valve 83, a bolt 84, and a nut 85 in addition to the seat member 32 described above. The disc valve 82 is provided on a lower side of the seat member 32. The disc valve 83 is provided on an upper side of the seat member 32. The bolt 84 is inserted into the disc valve 83, the seat member 32 and the disc valve 82 from above. In this state, the nut 85 is screwed onto a lower portion of the bolt 84. The bolt 84 and nut 85 thereby attach the disc valve 82 and the disc valve 83 to the seat member 32.

The seat member 32 has an annular shape. The seat member 32 includes a base part 88 and a protruding part 89. The base part 88 has a disc shape. As shown in FIG. 3, the base part 88 has a through hole 90 formed at a center in the radial direction. The through hole 90 penetrates the base part 88 in the axial direction of the seat member 32. The bolt 84 is inserted through the through hole 90 of the seat member 32. A passage hole 91 and a passage hole 92 are formed in the seat member 32 on a side outward from the through hole 90 in the radial direction of the seat member 32. The passage hole 91 and the passage hole 92 penetrate the base part 88 in the axial direction of the seat member 32. The passage hole 92 is on a side outward from the passage hole 91 in the radial direction of the seat member 32. A plurality of passage hole 91 and a plurality of passage holes 92 are formed in the seat member 32.

The protruding part 89 protrudes downward from an outer circumferential portion of the base part 88. The protruding part 89 is disposed on a side outward from the passage holes 92 in the radial direction of the base part 88. The protruding part 89 of the seat member 32 is in contact with the bottom part 12 of the shell 5. A passage groove 93 penetrating the protruding part 89 in the radial direction of the seat member 32 is formed in the protruding part 89. A plurality of passage grooves 93 are provided in the seat member 32 at regular intervals in the circumferential direction of the seat member 32. Thereby, a space between the seat member 32 and the bottom part 12 of the shell 5 communicates with a portion between the barrel part 11 of the shell 5 and the tube 3 shown in FIG. 1. Therefore, the space between the seat member 32 and the bottom part 12 of the shell 5 also forms the reservoir chamber 7.

As shown in FIG. 2, the shock absorber 1 includes a cup 101. The cup 101 is provided in the second chamber 20. The cup 101 includes a sleeve 102 and a base adapter 103.

The sleeve 102 has a cylindrical shape. The sleeve 102 has an outer diameter smaller than an inner diameter of the tube 3. The sleeve 102 is disposed on a radial inner side of the tube 3. A central axis of the sleeve 102 coincides with a central axis of the tube 3. The sleeve 102 is disposed in the second chamber 20 with a gap between itself and the tube 3 in the radial direction.

The sleeve 102 includes a main body part 111 and an enlarged diameter part 112. The main body part 111 has a cylindrical shape and is provided from an intermediate portion to a lower end portion in the axial direction of the sleeve 102. The enlarged diameter part 112 is provided at an upper end portion of the sleeve 102. An inner diameter of the enlarged diameter part 112 increases toward an upper end. An outer diameter of the enlarged diameter part 112 increases toward the upper end. The enlarged diameter part 112 increases in diameter in a direction away from the main body part 111 in the axial direction of the sleeve 102.

The sleeve 102 includes a groove 116 extending in the axial direction of the sleeve 102 at an inner circumferential portion on one end side thereof in the axial direction. The groove 116 is provided on the inner circumferential portion of the upper end side of the sleeve 102. The groove 116 is recessed outward in the radial direction of the sleeve 102 from an inner circumferential surface of the sleeve 102. The groove 116 extends from the enlarged diameter part 112 to an upper portion of the main body part 111. A plurality of grooves 116 are provided in the sleeve 102 at regular intervals in the circumferential direction of the sleeve 102. The plurality of grooves 116 have different lengths from the upper end of the sleeve 102. In other words, the plurality of grooves 116 have different lengths in the axial direction of the sleeve 102.

The base adapter 103 has an annular shape. The base adapter 103 includes a main plate part 121, a press-fitting part 122, and a leg part 123.

The main plate part 121 has a disc shape. As shown in FIG. 3, a recessed part 131 recessed upward from a lower surface of the main plate part 121 is formed in the main plate part 121 at a central portion in the radial direction on one side in the axial direction.

The press-fitting part 122 is provided at one end of the base adapter 103 in the axial direction. The press-fitting part 122 protrudes upward from an upper surface of the main plate part 121. The press-fitting part 122 has a cylindrical shape. The press-fitting part 122 has an outer diameter smaller than an outer diameter of the main plate part 121. The press-fitting part 122 of the base adapter 103 is press-fitted into a lower end portion of the sleeve 102. At that time, the upper surface of the main plate part 121 comes in contact with the lower end portion of the sleeve 102. Thereby, the base adapter 103 is fixed to the sleeve 102. In the way, the base adapter 103 is fixed to the sleeve 102 by press fitting.

The leg part 123 is provided at an end portion of the base adapter 103 on a side opposite to the press-fitting part 122 in the axial direction. The leg part 123 protrudes downward from an outer circumferential portion of the main plate part 121. The leg part 123 has a cylindrical shape. The leg part 123 is disposed on a side outward from the recessed part 131 in the radial direction of the main plate part 121. An inner circumferential portion 135 on an inner side of the leg part 123 in the radial direction becomes larger in diameter with distance away from the main plate part 121 in the axial direction of the base adapter 103. In other words, the inner circumferential portion 135 of the leg part 123 becomes larger in diameter with distance away from the main plate part 121 in the axial direction.

A communication groove 136 penetrating the main plate part 121 and the leg part 123 in the axial direction of the base adapter 103 is formed in the outer circumferential portion of the main plate part 121 and the leg part 123. The communication groove 136 opens outward in the radial direction of the base adapter 103. The communication groove 136 is formed on a side of the main plate part 121 radially outward from the sleeve 102. The communication groove 136 penetrates the leg part 123 in the radial direction of the base adapter 103. Therefore, the communication groove 136 opens to the upper surface of the main plate part 121, an outer circumferential surface of the main plate part 121, an outer circumferential surface of the leg part 123, a lower surface of the leg part 123, and an inner circumferential surface of the leg part 123. A plurality of communication grooves 136 are provided in the base adapter 103 at regular intervals in the circumferential direction of the base adapter 103.

The cup 101 including the base adapter 103 and the sleeve 102 fixed to the base adapter 103 is fixed by press-fitting the main plate part 121 of the base adapter 103 into the tube 3. At that time, the cup 101 is placed by bringing a lower end portion of the leg part 123 of the base adapter 103 into contact with an upper surface of the outer circumferential portion of the base part 88 of the seat member 32. At that time, the base adapter 103 hitting the bolt 84 of the first valve assembly 31 is avoided by the recessed part 131. At that time, the leg part 123 of the base adapter 103 surrounds the disc valve 83 of the first valve assembly 31 from an outer side in the radial direction. In other words, the leg part 123 is disposed to be spaced apart from the disc valve 83 on a side outward in the radial direction of the disc valve 83. The base adapter 103 placed on the first valve assembly 31 is provided between the sleeve 102 and the first valve assembly 31.

As described above, the press-fitting part 122 that is press-fitted into the sleeve 102 is provided at one end of the base adapter 103 in the axial direction. The leg part 123 placed on the first valve assembly 31 is provided at the other end of the base adapter 103 in the axial direction. The inner circumferential portion 135 of the leg part 123 increases in diameter toward the first valve assembly 31 in the axial direction of the base adapter 103.

A third chamber 141 is provided between the first valve assembly 31 and the base adapter 103. The third chamber 141 communicates with a portion of the second chamber 20 between the tube 3 and the sleeve 102 via a communication passage 142 in the communication groove 136 of the base adapter 103. In other words, the communication passage 142 that allows communication between the second chamber 20 and the third chamber 141 is provided in the leg part 123 of the base adapter 103.

In the first valve assembly 31, the plurality of passage holes 91 allow the oil fluid L to flow between the third chamber 141 and the reservoir chamber 7. The plurality of passage holes 92 allow the oil fluid L to flow between the reservoir chamber 7 and the third chamber 141.

The disc valve 82 on the reservoir chamber 7 side allows the oil fluid L to flow from the third chamber 141 to the reservoir chamber 7 through the passage holes 91. On the other hand, the disc valve 82 restricts a flow of the oil fluid L from the reservoir chamber 7 to the third chamber 141 through the passage holes 91. The disc valve 82 opens during the compression stroke of the shock absorber 1 to allow the oil fluid L to flow from the second chamber 20 and the third chamber 141 to the reservoir chamber 7 and generate a damping force.

The disc valve 83 on the third chamber 141 side allows a flow of the oil fluid L from the reservoir chamber 7 to the third chamber 141 through the passage holes 92. On the other hand, the disc valve 83 restricts a flow of the oil fluid L from the third chamber 141 to the reservoir chamber 7 through the passage holes 92. The disc valve 83 allows constant communication between the third chamber 141 and the passage holes 91. The disc valve 83 opens during the extension stroke of the shock absorber 1 to allow the oil fluid L to flow from the reservoir chamber 7 to the third chamber 141 and the second chamber and generate a damping force. Further, the disc valve 83 may be used as a suction valve that allows the oil fluid L to flow from the reservoir chamber 7 to the third chamber 141 and the second chamber substantially without generating a damping force.

As shown in FIG. 2, the sleeve 102 of the cup 101 opens upward. The shock absorber 1 includes a second valve assembly 151. The second valve assembly 151 is disposed in the second chamber 20 to be connected to the piston rod 21. The second valve assembly 151 is attached to the mounting shaft part 62 of the extender 42. The second valve assembly 151 enters from above and exits upward with respect to the sleeve 102 of the cup 101 via an opening at the upper end of the sleeve 102.

The second valve assembly 151 includes a valve base 152, a fitting member 153, and a third damping valve 154.

Figure 3:
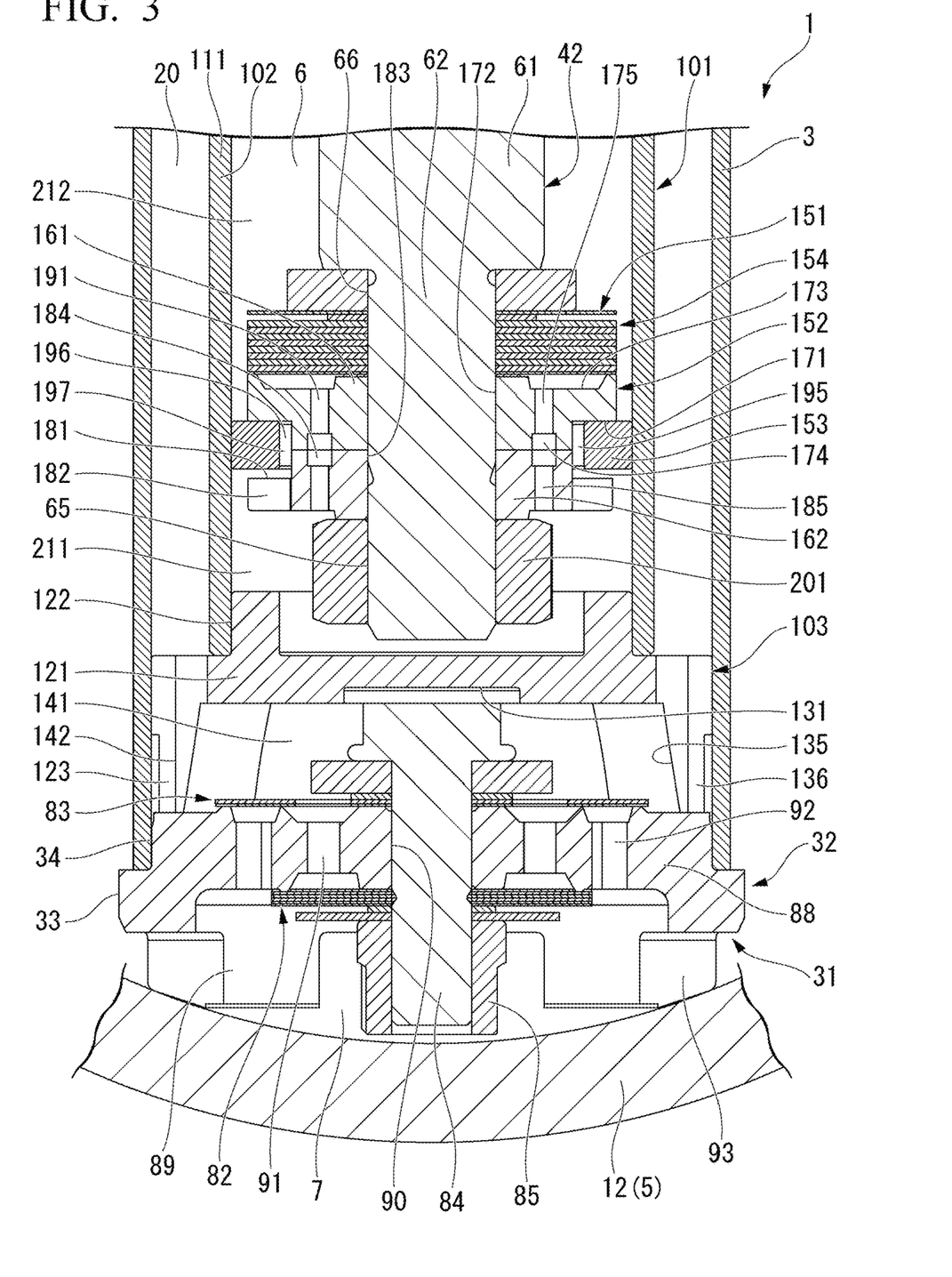
FIG. 3 is a cross-sectional view of a main part showing the shock absorber of the first embodiment according to the present invention.

As shown in FIG. 3, the valve base 152 includes a first base member 161 and a second base member 162. The first base member 161 constitutes an upper portion of the valve base 152. The second base member 162 constitutes a lower portion of the valve base 152.

The first base member 161 has an annular shape. A notch part 171 is formed in the first base member 161 at an outer circumferential portion on a lower side. The notch part 171 is formed over the entire circumference of the first base member 161. The notch part 171 has an annular shape.

The first base member 161 has a through hole 172 formed at a center thereof in the radial direction. The through hole 172 penetrates the first base member 161 in the axial direction of the first base member 161. The fitting shaft part 66 of the extender 42 is fitted in the through hole 172 of the first base member 161. A passage groove 173 is provided in the first base member 161 on a side outward from the through hole 172 in the radial direction of the first base member 161. A passage groove 174 and a passage hole 175 are provided in the first base member 161 between the through hole 172 and the notch part 171 in the radial direction of the first base member 161.

The passage groove 173 is formed at an upper end portion of the first base member 161. The passage groove 173 is recessed downward from an upper end surface of the first base member 161. The passage groove 173 has an annular shape that surrounds the through hole 172 from an outer side in the radial direction. The passage groove 173 opens upward.

The passage groove 174 is formed at a lower end portion of the first base member 161. The passage groove 173 is recessed upward from a lower end surface of the first base member 161. The passage groove 174 has an annular shape that surrounds the through hole 172 from an outer side in the radial direction. The passage groove 174 opens downward.

The passage hole 175 is formed at an intermediate portion of the first base member 161 in the axial direction. An upper end of the passage hole 175 opens at a bottom position of the passage groove 173 and a lower end thereof opens at a bottom position of the passage groove 174. A plurality of passage holes 175 are formed in the first base member 161 at intervals in the circumferential direction of the first base member 161.

The second base member 162 has an annular shape. The second base member 162 has a notch part 181 formed at an outer circumferential portion on an upper side. The notch part 181 is formed over the entire circumference of the second base member 162. The notch part 181 has an annular shape.

The second base member 162 includes a groove part 182 formed at an outer circumferential portion on a lower side. The groove part 182 is recessed inward in the radial direction of the second base member 162 from an outer circumferential surface of the second base member 162. The groove part 182 opens outward in the radial direction of the second base member 162. The groove part 182 opens to the notch part 181. The groove part 182 opens downward. A plurality of groove parts 182 are formed in the second base member 162 at intervals in the circumferential direction of the second base member 162.

The second base member 162 has a through hole 183 formed at a center in the radial direction. The through hole 183 penetrates the second base member 162 in the axial direction of the second base member 162. The fitting shaft part 66 of the extender 42 is fitted in the through hole 183 of the second base member 162. A passage groove 184 is provided in the second base member 162 on a side outward from the through hole 183 in the radial direction of the second base member 162. A passage hole 185 is provided in the second base member 162 between the through hole 183 and the notch part 181 in the radial direction of the second base member 162.

The passage groove 184 is formed at an upper end portion of the second base member 162. The passage groove 184 is recessed downward from an upper end surface of the second base member 162. The passage groove 184 has an annular shape that surrounds the through hole 183 from an outer side in the radial direction. The passage groove 184 opens upward.

The passage hole 185 is formed from a middle to a lower end portion in the axial direction of the second base member 162. An upper end of the passage hole 185 opens at a bottom position of the passage groove 184. A plurality of passage holes 185 are formed in the second base member 162 at intervals in the circumferential direction of the second base member 162.

In a state in which the valve base 152 is fitted to the fitting shaft part 66 of the extender 42, a lower end surface of the first base member 161 is in contact with an upper end surface of the second base member 162. Then, the passage groove 173, the passage holes 175, and the passage groove 174 of the first base member 161 communicate with the passage groove 184 and the passage holes 185 of the second base member 162. These passage grooves 173, 174, and 184 and passage holes 175 and 185 form a third passage 191. The third passage 191 is provided in the valve base 152 and penetrates the valve base 152 in the axial direction.

In the valve base 152, the notch part 171 of the first base member 161 and the notch part 181 of the second base member 162 form a disposition groove 195. The disposition groove 195 is recessed inward in the radial direction of the valve base 152 from an outer circumferential surface of the valve base 152. The disposition groove 195 has an annular shape. The disposition groove 195 opens outward in the radial direction. The plurality of groove parts 182 open to the disposition groove 195.

The fitting member 153 has an annular shape. The fitting member 153 has an outer diameter larger than an outer diameter of the valve base 152. The fitting member 153 is disposed between the notch part 171 and the notch part 181 when the first base member 161 and the second base member 162 are assembled to the extender 42. Thereby, the fitting member 153 is disposed in the disposition groove 195 of the valve base 152. The fitting member 153 is movable in the axial direction with respect to the valve base 152 in the disposition groove 195.

An interposing member 197 is provided between an inner circumferential portion of the fitting member 153 and a bottom portion of the disposition groove 195. The interposing member 197 coaxially holds the fitting member 153 with respect to the valve base 152. The interposing member 197 has an axial passage 196 penetrating therethrough in the axial direction. The interposing member 197 is, for example, cylindrical and has a shape in which a plurality of grooves penetrating an outer circumferential portion in the axial direction are formed. The interposing member 197 is press-Fitted in the inner circumferential portion of the fitting member 153. Thereby, the interposing member 197 is fixed to the fitting member 153. The plurality of grooves formed in the outer circumferential portion of the interposing member 197 form the axial passage 196.

The third damping valve 154 is a disc valve constituted by laminating a plurality of annular discs. The fitting shaft part 66 of the extender 42 is fitted to a radial inner side of the third damping valve 154. The third damping valve 154 is disposed between the main shaft part 61 of the extender 42 and the valve base 152. The third damping valve 154 opens the third passage 191 when a portion on the outer circumferential side is separated from the valve base 152. The third damping valve 154 closes the third passage 191 when the portion on the outer circumferential side comes in contact with the valve base 152.

A nut 201 is screwed onto the screw shaft part 65 of the extender 42. The second valve assembly 151 including the valve base 152 and the third damping valve 154 is attached to the mounting shaft part 62 of the extender 42 with the nut 201. Therefore, as shown in FIG. 2, the second valve assembly 151 is provided on the first valve assembly 31 side with respect to the piston assembly 17 of the piston rod 21. The valve base 152 is fixed to the piston rod 21. Therefore, the valve base 152 and the piston rod 21 move together.

Here, when the piston rod 21 is in a first predetermined range in which the second valve assembly 151 is disposed above the sleeve 102 and is not fitted to the sleeve 102, the inside of the cup 101 becomes the second chamber 20 as a whole.

From this state, in the compression stroke, the piston rod 21 moves to a second predetermined range on the base adapter 103 side from the first predetermined range. Then, the second valve assembly 151 causes the fitting member 153 to be fitted into the sleeve 102. At the beginning of this fitting, the fitting member 153 moves upward relative to the disposition groove 195 of the valve base 152 due to a frictional force with the sleeve 102 in contact therewith. As a result, an upper surface of the fitting member 153 is brought into contact with the valve base 152. Then, the axial passage 196 is closed. In the compression stroke thereafter, the fitting member 153 is pushed by the valve base 152 while the axial passage 196 remains closed, and slides in the sleeve 102 to the base adapter 103 side.

When the fitting member 153 of the second valve assembly 151 is fitted into the sleeve 102, the second chamber 20 is divided into a fourth chamber 211 and a fifth chamber 212. The fourth chamber 211 is a portion between the second valve assembly 151 and the base adapter 103 in the cup 101. The fifth chamber 212 is a portion of the second chamber 20 excluding the fourth chamber 211. The fifth chamber 212 includes a portion between the tube 3 and the cup 101 and a portion between the piston assembly 17 and the second valve assembly 151.

In the compression stroke in the second predetermined range, the second valve assembly 151, together with the piston rod 21, moves to the base adapter 103 side while the axial passage 196 is closed as described above. At an upper portion of the second predetermined range, the fitting member 153 is at a position of the plurality of grooves 116 provided in the sleeve 102 and allows the oil fluid L to flow from the fourth chamber 211 to the fifth chamber 212 through the plurality of grooves 116. At that time, as the second valve assembly 151 approaches the base adapter 103, among the plurality of grooves 116, the number of grooves 116 through which the oil fluid L flows from the fourth chamber 211 to the fifth chamber 212 decreases, and finally becomes zero.

Also, in the compression stroke in the second predetermined range, the second valve assembly 151 moves to the base adapter 103 side while the axial passage 196 is closed as described above. At that time, the third damping valve 154 opens depending on a piston speed which is a moving speed of the piston rod 21, the piston 18, and the valve base 152 with respect to the tube 3. Then, the oil fluid L flows from the fourth chamber 211 to the fifth chamber 212 through the third passage 191. Thereby, the third damping valve 154 suppresses an excessive increase in pressure in the fourth chamber 211. The third damping valve 154 is provided in the third passage 191 and allows the oil fluid L to flow from the fourth chamber 211 to the fifth chamber 212 while generating a damping force by suppressing the flow of the oil fluid L that occurs during the compression stroke. Here, the third damping valve 154 has higher rigidity than the second damping valve 76 and is difficult to open. Therefore, the third damping valve 154 opens later than the second damping valve 76 and generates a higher damping force than the second damping valve 76.

With the fitting member 153 fitted in the sleeve 102 of the cup 101, the second valve assembly 151, together with the piston rod 21, moves to a side opposite to the base adapter 103. Then, the fitting member 153 moves downward relative to the disposition groove 195 of the valve base 152 due to the frictional force with the sleeve 102. As a result, the upper surface of the fitting member 153 is separated from the valve base 152. Thereby, the axial passage 196 opens. In the extension stroke thereafter, the fitting member 153 is pushed by the valve base 152 while the axial passage 196 remains open, and slides in the sleeve 102 to a side opposite to the base adapter 103. When the second valve assembly 151 moves to a side opposite to the base adapter 103, the oil fluid L is allowed to flow from the fifth chamber 212 to the fourth chamber 211, from the axial passage 196 through the passages in the groove parts 182 of the valve base 152. Thereby, a resistance force to movement of the piston rod 21 in an extension direction is reduced.

The second valve assembly 151 is separated from the base adapter 103 by a predetermined distance during the extension stroke from a state in which the fitting member 153 is on the base adapter 103 side with respect to all the grooves 116 in the sleeve 102. Then, the grooves 116 provided in the sleeve 102 open to the fourth chamber 211. Then, the oil fluid L flows from the fifth chamber 212 to the fourth chamber 211 through the grooves 116. At that time, as the second valve assembly 151 becomes further away from the base adapter 103, among the plurality of grooves 116, the number of grooves 116 through which the oil fluid L flows from the fifth chamber 212 to the fourth chamber 211 increases. Thereby, the resistance force to the movement of the piston rod 21 in the extension direction is reduced in stages.

Next, main operations of the shock absorber 1 will be described.

"Extension Stroke in which Piston Rod 21 is in First Predetermined Range"
{First Region in which Piston Speed is Lower than First Predetermined Value}

In this first region of the extension stroke, the oil fluid L from the first chamber 19 flows to the second chamber 20 from the first passage 71 through the fixed orifice (not shown) between the first damping valve 75 and the piston 18 in the piston assembly 17. Therefore, in the first region of the extension stroke, a damping force having orifice characteristics (in which the damping force is substantially proportional to the square of the piston speed) is generated.

{Second Region in which Piston Speed is Equal to or Higher than First Predetermined Value}

In this second region of the extension stroke, the oil fluid L from the first chamber 19 flows to the second chamber 20 by opening the first damping valve 75 from the first passage 71 in the piston assembly 17. Therefore, in the second region of the extension stroke, a damping force having valve characteristics (in which the damping force is substantially proportional to the piston speed) due to the first damping valve 75 is generated.

"Compression Stroke in which Piston Rod 21 is in First Predetermined Range"

{Third Region in which Piston Speed is Lower than Second Predetermined Value}

In this third region of the compression stroke, the oil fluid L from the second chamber 20 flows to the first chamber 19 from the second passage 72 through the fixed orifice (not shown) between the second damping valve 76 and the piston 18 in the piston assembly 17. Therefore, in the third region of the compression stroke, a damping force having orifice characteristics is generated.

{Fourth Region in which Piston Speed is Equal to or Higher than Second Predetermined Value}

In this fourth region of the compression stroke, the oil fluid L from the second chamber 20 flows to the first chamber 19 by opening the second damping valve 76 from the second passage 72 in the piston assembly 17. Therefore, in the fourth region of the compression stroke, a damping force having valve characteristics due to the second damping valve 76 is generated.

"Compression Stroke in which Piston Rod 21 is in Second Predetermined Range"

In this compression stroke, the piston assembly 17 operates in the same manner as in the first predetermined range. In addition, the second valve assembly 151 moves to the base adapter 103 side in the axial direction of the tube 3 to cause the fitting member 153 to be fitted into the sleeve 102. Then, the fitting member 153 closes the axial passage 196 at the beginning thereof.

With the axial passage 196 closed in this way, the second valve assembly 151 moves to the base adapter 103 side. Then, the oil fluid L flows from the fourth chamber 211 to the fifth chamber 212 through the plurality of grooves 116 provided in the sleeve 102. At that time, as the second valve assembly 151 approaches the base adapter 103, among the plurality of grooves 116, the number of grooves 116 through which the oil fluid L flows from the fourth chamber 211 to the fifth chamber 212 decreases, and finally becomes zero. Thereby, a damping force of the second valve assembly 151 increases in stages, and a resistance force to movement of the piston rod 21 in a compression direction increases in stages. Here, a length of a press-fitting axis between the press-fitting part 122 of the base adapter 103 and the sleeve 102 is set so that the sleeve 102 does not come off from the press-fitting part 122 even when the fourth chamber 211 reaches a maximum pressure.

Here, when the second valve assembly 151 moves to the base adapter 103 side, the third damping valve 154 opens depending on the piston speed. Then, the oil fluid L flows from the fourth chamber 211 to the fifth chamber 212 through the third passage 191. Thereby, an excessive increase in pressure in the fourth chamber 211 is suppressed.

"Extension Stroke in which Piston Rod 21 is in Second Predetermined Range"

In this extension stroke, the piston assembly 17 operates in the same manner as in the first predetermined range. In addition, the second valve assembly 151 moves to a side opposite to the base adapter 103. Then, the fitting member 153 opens the axial passage 196 at the beginning thereof.

With the axial passage 196 opened in this way, the second valve assembly 151 moves to a side opposite to the base adapter 103. Then, the oil fluid L flows from the fifth chamber 212 to the fourth chamber 211 through the axial passage 196 and the passages in the groove parts 182 of the valve base 152. When the fitting member 153 of the second valve assembly 151 passes a position of the grooves 116 provided in the sleeve 102 from a state in which it is on the base adapter 103 side with respect to all the grooves 116 provided in the sleeve 102, the oil fluid L flows from the fifth chamber 212 to the fourth chamber 211 through the passages 116. At that time, as the second valve assembly 151 becomes further away from the base adapter 103, among the plurality of grooves 116, the number of grooves 116 through which the oil fluid L flows from the fifth chamber 212 to the fourth chamber 211 increases. In other words, as the second valve assembly 151 becomes further away from the base adapter 103, the damping force becomes lower, and the resistance force to the movement of the piston rod 21 in the extension direction becomes lower.

The specification of U.S. Pat. No. 9,605,726 described above discloses a shock absorber in which a damping force is increased when a rod reaches a predetermined range on a limit side during a compression stroke in which the rod is pushed into a cylinder. Incidentally, there has been a demand to suppress an increase in cost in shock absorbers. For example, FIG. 13 of the specification of U.S. Pat. No. 9,605,726 discloses a structure in which a tube is connected to a cup and the cup is connected to a valve assembly. When the shock absorber is assembled, an axial force is input to the tube from the shell. With the structure disclosed in FIG. 13 of the specification of U.S. Pat. No. 9,605,726, the axial force of the tube should be received by the cup. Therefore, it is necessary to increase a strength of the cup. As a result, the costs increase.

The shock absorber 1 of the first embodiment includes the tube 3, the first valve assembly 31, the piston assembly 17, the piston rod 21, the cup 101, and the second valve assembly 151. The tube 3 has the inner chamber 6 inside. The first valve assembly 31 is connected to one end of the tube 3 in the axial direction. The piston assembly 17 divides the inner chamber 6 into the first chamber 19 and the second chamber 20. The piston rod 21 extends from the tube 3 through the first chamber 19 with the piston assembly 17 connected to an intermediate position thereof in the axial direction. The cup 101 is provided in the second chamber 20. The second valve assembly 151 is disposed in the second chamber 20 to be connected to the piston rod 21 and enters and exits from the cup 101. The cup 101 includes the sleeve 102 and the base adapter 103. The sleeve 102 is disposed in the second chamber 20 with a gap between itself and the tube 3 in the radial direction. The base adapter 103 is fixed to the sleeve 102 by press fitting and provided between the sleeve 102 and the first valve assembly 31.

When the shock absorber 1 is assembled, an axial force is input to the tube 3 from the swaged part 35 and the bottom part 12 of the shell 5 via the seal member 24, the rod guide 23, and the first valve assembly 31. In the shock absorber 1, the first valve assembly 31 is connected to one end of the tube 3 in the axial direction. Therefore, the axial force to the tube 3 can be received by the first valve assembly 31. Thereby, there is no need for the base adapter 103 to receive the axial force of the tube 3. Therefore, a strength of the base adapter 103 can be made low compared to when receiving the axial force of the tube 3. As a result, since a degree of freedom in material of the base adapter 103 is increased, a low-cost material can be selected. Therefore, an increase in costs of the shock absorber 1 can be suppressed. Also, a lightweight material can be selected for the base adapter 103. Therefore, an increase in weight of the shock absorber 1 can be suppressed.

In the shock absorber 1, the base adapter 103 is fixed to the sleeve 102 by press fitting. Therefore, the base adapter 103 and the sleeve 102 can be integrated before being assembled to the shock absorber 1. Therefore, since the base adapter 103 and the sleeve 102 can be handled as a single part, handling is facilitated, and assembly to the shock absorber 1 is also facilitated.

The shock absorber 1 includes the press-fitting part 122 press-fitted into the sleeve 102 provided at one end of the base adapter 103 in the axial direction, and the leg part 123 placed on the first valve assembly 31 provided at the other end of the base adapter 103 in the axial direction. The communication passage 142 that allows the third chamber 141 between the first valve assembly 31 and the base adapter 103 to communicate with the second chamber 20 is provided in the leg part 123. Since the communication passage 142 is provided in the leg part 123 in this way, a gap in the radial direction between the tube 3 and the sleeve 102 can be reduced compared to a case in which the communication passage is provided on a side inward from the leg part 123 in the radial direction of the main plate part 121.

In the shock absorber 1, the inner circumferential portion 135 of the leg part 123 increases in diameter toward the first valve assembly 31. As a result, an outer diameter of the disc valve 83 of the first valve assembly 31 can be increased compared to a case in which the inner circumferential portion 135 has a constant diameter. Therefore, a variable width of the damping force of the disc valve 83 can be increased. Particularly, when the disc valve 83 is used as a suction valve that substantially does not generate a damping force, the damping force can be brought close to zero by increasing the diameter of the disc valve 83.

Second Embodiment

Figure 4:
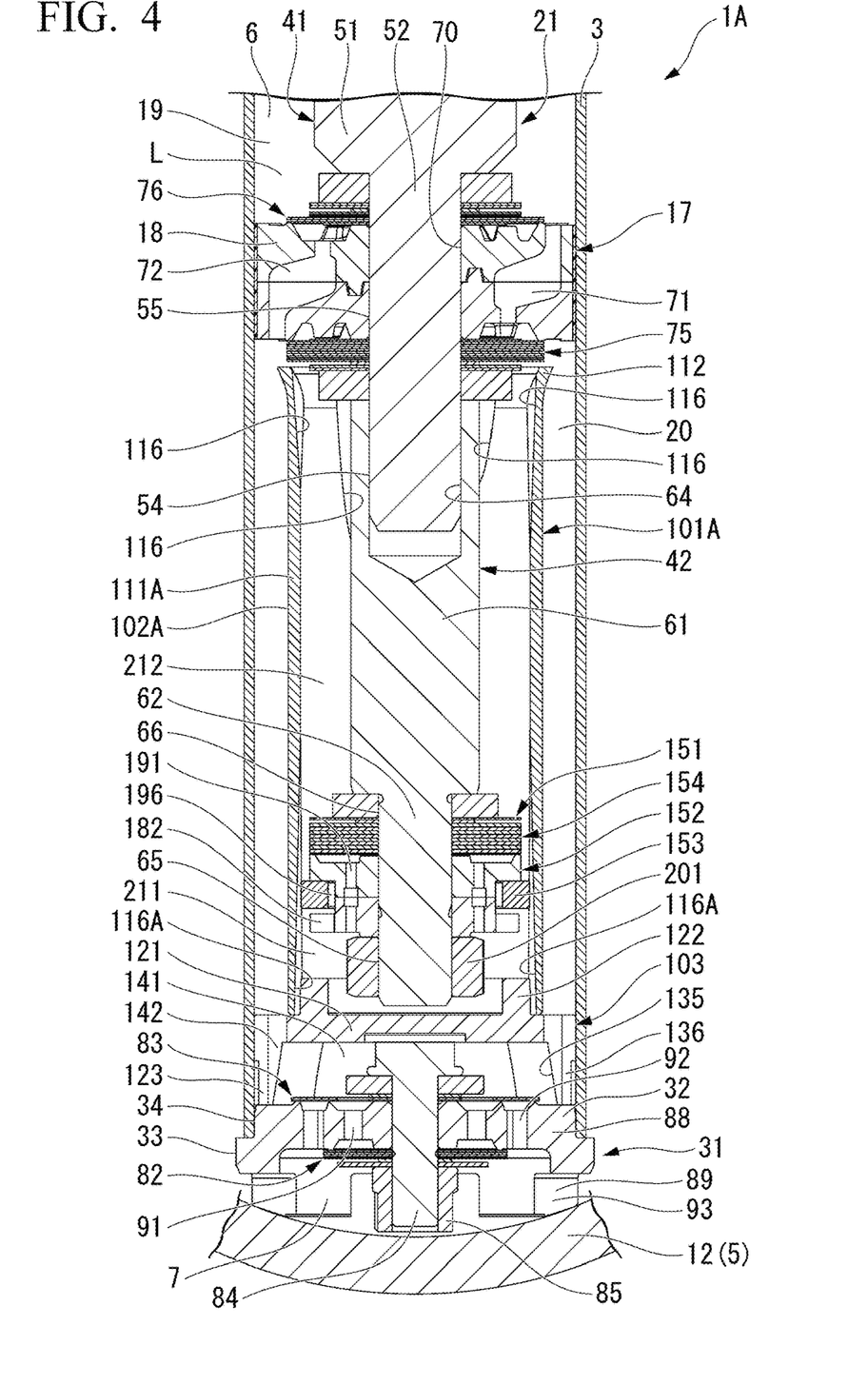
FIG. 4 is a cross-sectional view of a main part showing a shock absorber of a second embodiment according to the present invention.

Next, a shock absorber of a second embodiment will be described mainly on the basis of FIG. 4, focusing on differences from the first embodiment. Further, parts common to those in the first embodiment will be denoted by the same terms and the same reference signs.

A shock absorber 1A of the second embodiment includes a cup 101A that is partially different from the cup 101 instead of the cup 101. The cup 101A includes a sleeve 102A that is partially different from the sleeve 102 instead of the sleeve 102. The sleeve 102A includes a main body part 111A that is partially different from the main body part 111 instead of the main body part 111.

As in the sleeve 102, a plurality of grooves 116 extending in an axial direction of the sleeve 102A are provided at an inner circumferential portion on one end side of the sleeve 102A in the axial direction. A groove 116A extending in the axial direction of the sleeve 102A is also provided at an inner circumferential portion on the other end side of the sleeve 102A in the axial direction. The groove 116A is provided on an inner circumferential portion of a lower end of the sleeve 102A. The groove 116A is recessed outward in a radial direction of the sleeve 102A from an inner circumferential surface of the sleeve 102A. A plurality of grooves 116A are provided in the sleeve 102A at regular intervals in the circumferential direction of the sleeve 102A. The plurality of grooves 116A have the same length from the lower end of the sleeve 102A. In other words, the plurality of grooves 116A have the same length in the axial direction of the sleeve 102A.

A press-fitting part 122 of a base adapter 103 is press-fitted into the lower end portion of the sleeve 102A. At that time, an upper surface of a main plate part 121 comes in contact with the lower end portion of the sleeve 102A. Thereby, lower ends of the plurality of grooves 116A are closed and the base adapter 103 is fixed to the sleeve 102A. The plurality of grooves 116A extend above the press-fitting part 122.

A piston rod 21 moves from a first predetermined range in which a second valve assembly 151 is not fitted in the sleeve 102A to a second predetermined range in a compression stroke. Then, the second valve assembly 151 causes a fitting member 153 to be fitted into the sleeve 102A. At the beginning of this fitting, the fitting member 153 closes an axial passage 196.

In the compression stroke in the second predetermined range, the second valve assembly 151, together with the piston rod 21, moves to the base adapter 103 side while the axial passage 196 is closed as described above. At an upper portion of the second predetermined range, the fitting member 153 is at a position of the plurality of grooves 116 provided in the sleeve 102A and allows an oil fluid L to flow from a fourth chamber 211 to a fifth chamber 212 through the plurality of grooves 116. At that time, as the second valve assembly 151 approaches the base adapter 103 side, among the plurality of grooves 116, the number of grooves 116 through which the oil fluid L flows from the fourth chamber 211 to the fifth chamber 212 decreases, and finally becomes zero.

Also, in the compression stroke in the second predetermined range, the second valve assembly 151 moves to the base adapter 103 side while the axial passage 196 is closed as described above. At that time, a third damping valve 154 opens depending on a piston speed. Then, the oil fluid L flows from the fourth chamber 211 to the fifth chamber 212 through a third passage 191. Thereby, the third damping valve 154 suppresses an excessive increase in pressure in the fourth chamber 211.

Here, in the compression stroke, when the second valve assembly 151 approaches a lower limit position of the second predetermined range, the fitting member 153 is positioned at a position of the plurality of grooves 116A provided in the sleeve 102A. Then, the oil fluid L flows from the fourth chamber 211 to the fifth chamber 212 through the plurality of grooves 116A provided in the sleeve 102A. Thereby, the plurality of grooves 116A suppress an excessive increase in pressure in the fourth chamber 211.

From this state, the second valve assembly 151, together with the piston rod 21, moves to a side opposite to the base adapter 103. Then, the fitting member 153 opens the axial passage 196. In this state, when the second valve assembly 151 moves to a side opposite to the base adapter 103, the oil fluid L is allowed to flow from the fifth chamber 212 to the fourth chamber 211, from the axial passage 196 through a passage in a groove part 182 of a valve base 152. At the same time, the oil fluid L is allowed to flow from the fifth chamber 212 to the fourth chamber 211 through the plurality of grooves 116A. Thereby, a resistance force to movement of the piston rod 21 in an extension direction is reduced.

When the fitting member 153 is positioned on a side opposite to the base adapter 103 with respect to all the grooves 116A in the sleeve 102A, the second valve assembly 151 allows the oil fluid L to flow from the fifth chamber 212 to the fourth chamber 211 only through a flow path from the axial passage 196 through the passage in the groove part 182 of the valve base 152.

In the shock absorber 1A of the second embodiment, the grooves 116 extending in the axial direction of the sleeve 102A are provided at an inner circumferential portion on one end side of the sleeve 102A in the axial direction, and the grooves 116A extending in the axial direction of the sleeve 102A are provided at an inner circumferential portion on the other end side of the sleeve 102A in the axial direction. Thereby, at the beginning of the compression stroke in the second predetermined range, a rate of change in damping force becomes gentle due to the grooves 116 on the upper end side. Since there is no groove in the middle of the sleeve 102A in the axial direction, the damping force increases at the middle position in the second predetermined range of the compression stroke. On the lower end side of the second predetermined range, an increase in damping force is suppressed by the grooves 116A. The grooves 116A can serve the role of a relief.

Further, in the embodiments, a hydraulic shock absorber has been shown as an example of the shock absorbers 1 and 1A, but the above-described structure can also be employed for a shock absorber using water or air as a working fluid.

EXPLANATION OF REFERENCES 1, 1A Shock absorber
3 Tube
6 Inner chamber
17 Piston assembly
19 First chamber
20 Second chamber
21 Piston rod
31 First valve assembly
101, 101A Cup
102, 102A Sleeve
103 Base adapter
116, 116A Groove
122 Press-fitting part
123 Leg part
135 Inner circumferential portion
141 Third chamber
142 Communication passage
151 Second valve assembly

What is claimed is:

1. A shock absorber comprising:
a tube having an inner chamber inside;
a first valve assembly connected to one end of the tube in an axial direction;
a piston assembly dividing the inner chamber into a first chamber and a second chamber;
a piston rod extending from the tube through the first chamber with the piston assembly connected to an intermediate position thereof in the axial direction;
a cup provided in the second chamber; and
a second valve assembly disposed in the second chamber to be connected to the piston rod and configured to enter and exit from the cup, wherein
the cup includes:
a sleeve disposed in the second chamber with a gap between itself and the tube in a radial direction; and
a base adapter fixed to the sleeve by press fitting and provided between the sleeve and the first valve assembly, and wherein
a groove extending in the axial direction of the sleeve is provided at an inner circumferential portion on one end side of the sleeve in the axial direction and an inner circumferential portion on the other end side of the sleeve in the axial direction.

2. The shock absorber according to claim 1, wherein
a third chamber is provided between the first valve assembly and the base adapter,
a press-fitting part press-fitted into the sleeve is provided at one end of the base adapter in the axial direction,
a leg part placed on the first valve assembly is provided at the other end of the base adapter in the axial direction, and
a communication passage allowing communication between the second chamber and the third chamber is provided in the leg part.

3. The shock absorber according to claim 2, wherein an inner circumferential portion of the leg part increases in diameter toward the first valve assembly.

* * * * *